United States Patent
Zhu et al.

(10) Patent No.: US 9,544,429 B2
(45) Date of Patent: Jan. 10, 2017

(54) SOLUTIONS FOR VOICE OVER INTERNET PROTOCOL (VOIP) 911 LOCATION SERVICES

(71) Applicant: TeleCommunication Systems, Inc., Annapolis, MD (US)

(72) Inventors: Yinjun Zhu, Mercer Island, WA (US); Richard Dickinson, Seattle, WA (US); Roger Marshall, Auburn, WA (US); Steven P. Helme, Shoreline, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/842,071

(22) Filed: Sep. 1, 2015

(65) Prior Publication Data
US 2015/0373488 A1    Dec. 24, 2015

Related U.S. Application Data

(63) Continuation of application No. 14/297,216, filed on Jun. 5, 2014, now Pat. No. 9,237,228, which is a (Continued)

(51) Int. Cl.
H04M 3/42 (2006.01)
H04L 29/06 (2006.01)
(Continued)

(52) U.S. Cl.
CPC .... *H04M 3/42348* (2013.01); *H04L 29/06027* (2013.01); *H04L 61/106* (2013.01); *H04L 65/1006* (2013.01); *H04L 65/1069* (2013.01); *H04L 65/1083* (2013.01); *H04L 67/14* (2013.01); *H04L 67/141* (2013.01); *H04L 67/18* (2013.01); *H04M 3/42* (2013.01); *H04M 3/42357* (2013.01); *H04M 3/5116* (2013.01); *H04M 3/5231* (2013.01); *H04M 7/006* (2013.01); *H04M 7/0075* (2013.01); *H04W 4/02* (2013.01); *H04W 4/20* (2013.01);
(Continued)

(58) Field of Classification Search
CPC .......................... H04W 76/007; H04W 80/04
See application file for complete search history.

(56) References Cited

U.S. PATENT DOCUMENTS

| | | | |
|---|---|---|---|
| 2005/0063528 A1 | 3/2005 | Pearson et al. | |
| 2010/0074148 A1* | 3/2010 | Poremba | H04L 12/66 370/259 |
| 2013/0029634 A1* | 1/2013 | Li | H04W 4/22 455/404.2 |

* cited by examiner

*Primary Examiner* — Barry Taylor
(74) *Attorney, Agent, or Firm* — Tarolli, Sundheim, Vocell & Tummino LLP

(57) ABSTRACT

An E-9-1-1 voice-over-IP (VoIP) solution is provided wherein a 911 call from a mobile VoIP device is routed directly to the correct Public Safety Answer Point (PSAP) via dedicated trunks, together with correct location information and call-back number. VoIP gateways are implemented locally, at least one per LATA, and accept VoIP packetized data inbound, and convert it to standard wireline voice calls. Calls are routed to an IP address at the VoIP gateway, which then egresses the call to a voice port at a selective router. Mid-call updating of location of a moving VoIP terminal is provided to a PSAP. The location of the VoIP is validated using HTTP based protocol by pushing location information to a VoIP location server, and comparing it against a geographic location database to confirm that a contained street address is valid.

19 Claims, 12 Drawing Sheets

Related U.S. Application Data continuation of application No. 13/775,670, filed on Feb. 25, 2013, now Pat. No. 8,798,572, which is a continuation of application No. 13/064,203, filed on Mar. 10, 2011, now Pat. No. 8,385,881, which is a continuation of application No. 11/819,262, filed on Jun. 26, 2007, now Pat. No. 7,912,446, which is a continuation of application No. 10/836,330, filed on May 3, 2004, now Pat. No. 7,260,186, application No. 14/842,071, which is a continuation of application No. 10/739,292, filed on Dec. 19, 2003, now Pat. No. 6,940,950.

(60) Provisional application No. 60/555,305, filed on Mar. 23, 2004.

(51) Int. Cl.

| | |
|---|---|
| *H04L 29/12* | (2006.01) |
| *H04M 3/51* | (2006.01) |
| *H04W 4/02* | (2009.01) |
| *H04W 4/20* | (2009.01) |
| *H04W 4/22* | (2009.01) |
| *H04W 76/00* | (2009.01) |
| *H04L 29/08* | (2006.01) |
| *H04M 3/523* | (2006.01) |
| *H04M 7/00* | (2006.01) |
| *H04M 11/04* | (2006.01) |
| *H04W 40/02* | (2009.01) |
| *H04W 76/04* | (2009.01) |
| *H04W 80/00* | (2009.01) |
| *H04W 80/04* | (2009.01) |

(52) U.S. Cl.
CPC ........... *H04W 4/22* (2013.01); *H04W 76/007* (2013.01); *H04M 3/42042* (2013.01); *H04M 3/42195* (2013.01); *H04M 7/0024* (2013.01); *H04M 11/04* (2013.01); *H04M 2242/04* (2013.01); *H04M 2242/30* (2013.01); *H04W 40/02* (2013.01); *H04W 76/04* (2013.01); *H04W 80/00* (2013.01); *H04W 80/04* (2013.01)

SOLUTIONS FOR VOICE OVER INTERNET PROTOCOL (VOIP) 911 LOCATION SERVICES

This application is a continuation of U.S. application Ser. No. 14/297,216, entitled "Solutions for Voice Over Internet Protocol (VoIP) 911 Location Services", filed on Jun. 5, 2014, to ZHU et al.; which is a continuation of U.S. application Ser. No. 13/775,670, entitled "Solutions for Voice Over Internet Protocol (VoIP) 911 Location Services", filed on Feb. 25, 2013, to ZHU et al., now U.S. Pat. No. 8,798,572; which in turn is a continuation of U.S. application Ser. No. 13/064,203, entitled "Solutions for Voice Over Internet Protocol (VoIP) 911 Location Services", filed on Mar. 10, 2011 to ZHU, et al., now U.S. Pat. No. 8,385,881; which in turn in is a continuation of U.S. application Ser. No. 11/819,262, entitled "Solutions for Voice Over Internet Protocol (VoIP) 911 Location Services" filed on Jun. 26, 2007 to Zhu, et al., now U.S. Pat. No. 7,912,446; which in turn is a continuation of U.S. application Ser. No. 10/836,330, entitled "Solutions for Voice Over Internet Protocol (VoIP) 911 Location Services" filed on May 3, 2004 to Zhu, et al., now U.S. Pat. No. 7,260,186; which claims priority from U.S. Provisional Appl. No. 60/555,305, entitled "Solutions For VoIP 911 Location Services" filed on Mar. 23, 2004 to Zhu, et al., and from U.S. application Ser. No. 10/739,292, entitled "Enhanced E911 Location Information Using Voice Over Internet Protocol (VoIP)" filed on Dec. 19, 2003 to Dickinson, et al., now U.S. Pat. No. 6,940,950, the entirety of all of which are explicitly incorporated herein by reference.

BACKGROUND OF THE INVENTION

1. Field of the Invention

This invention relates generally to Voice Over Internet Protocol (VoIP) and long distance carriers, Internet Service Providers (ISPs), and information content delivery services/providers and long distance carriers. More particularly, it relates to 911 location services for the telecommunication industry.

2. Background of Related Art 911 is a phone number widely recognized as an emergency phone number that is used by emergency dispatch personnel, among other things, to determine a location of a caller. Enhanced 911 (E911) is defined by the transmission of callback number and location information. E911 may be implemented for landline and/or mobile devices.

Some Public Safety Access Points (PSAPs) are not enhanced, and thus do not receive the callback or location information from any phone, landline or mobile.

Voice Over IP (VoIP) is a technology that has been developed as an alternative telephony technology to the conventional telephony service (e.g. PSTN). VoIP takes advantage of high speed Internet data switched networks, and is able to provide low cost telephony services to end users. VoIP technology emulates a phone call, but instead of using a circuit based system such as the telephone network, utilizes packetized data transmission techniques most notably implemented in the Internet.

Voice Over IP is not a single technology, but rather four distinctive applications targeted at distinct market segments in either static, portable, or mobile environments. A first application is the use of VoIP technology with cable and digital subscriber line (DSL), often deployed in static configurations in which the end user stays at a fixed location and uses the standard North American Numbering Plan. Examples of this type service include residential line replacement using cable or DSL connections. Another frequent application is an enterprise use of VoIP technology, usually deployed in static configurations with occasional portability, allowing the end user to easily move his telephony connection anywhere within the enterprise campus. A third application is the use of VoIP with an Internet Service Provider (ISP), usually provided as a highly portable telephony configuration which allows the end user to establish a telecommunications connection wherever they can obtain an internet-based connection to their ISP provider. A last application is the use of VoIP with a Wireless Fidelity (WiFi) network. This is a mobile telephony configuration that allows the end user to take a home-based telephony connection and roam within an interconnected WiFi network, much like cellular technologies allow today.

As VoIP service providers begin to offer VoIP packet based telephony service to the general public as a replacement to conventional switched telephone networks, one key service related issue has been identified in the need to support the ability to determine a caller's location when they dial "911" using a VoIP device. The FCC in the United States has mandated E911 for wireless devices, but not (yet) for VoIP. The VoIP industry, with NENA encouragement, is currently making efforts to voluntarily comply. Moreover, such 911 services become even more important as additional mobility options become available for VoIP terminals, e.g., mobile VoIP phones.

There are at least three VoIP scenarios that require E911 service:

1. The VoIP device is physically connected to a static data cable at a "home" address.
2. The VoIP device is physically connected to a data cable at a location different than its "home" address. For instance, a laptop computer device utilized away from home as a VoIP communication device would be a VoIP 'visitor' device as described by this scenario.
3. The VoIP device is wireleless, physically disconnected from any data cable. In this situation, the VoIP device connects to the VoIP network via cellular or WiFi technology.

A VoIP gateway is a gateway that bridges a VoIP network (i.e., a packet switched voice service) with a conventional public switched telephone network (PSTN) (i.e., a circuit switched voice service). A major advantage enjoyed by users of a VoIP network is often referred to as "long distance bypassing". To accomplish a suitable VoIP network, a VoIP provider establishes VoIP gateways throughout a region or country of interest. Each VoIP gateway is connected to a local PSTN. This allows VoIP customers to make long distance calls via the VoIP network, which then route the call to a desired destination using the local circuit at the local gateway.

Conventional VoIP voice gateways are typically located in only a few places across the country. Thus, any 911 call originating in a city such as Miami, for example, may initially be routed to the public safety answer point (PSAP) in, e.g., Minneapolis if the VoIP gateway happens to be located in Minneapolis. Moreover, the call will not be "enhanced". That is, it will not provide any location or callback information to the dispatcher.

Not all PSAPs support direct-dial administrative lines, many administrative lines are not answered 24 hours-a-day or during periods of heavy call volume, and administrative lines do not support the ability to automatically identify the location of a party dialing 911. Rather, the location of the caller is typically conveyed verbally or through alternative data entry methods that are not supported by all PSAPs. Furthermore, today's VoIP solutions for portable environments terminate calls to an administrative telephone lines at a Public Safety Answering Point (PSAP)-not directly to emergency operators. Thus, unlike 911 calls originating from a wireline or a mobile phones, 911 calls made from a device utilizing VoIP may be routed to an administrative line and are sometimes answered by a front desk receptionist or administrator instead of an actual emergency operator, wasting valuable seconds in the case of an emergency. In addition, existing solutions for 911 calls made on a VoIP network are frequently unable to determine the geographic location of the VoIP caller dialing 911. For example, if an individual is using a virtual private network to tunnel into a corporate server and make a VoIP call through that server, a 911 call will provide no location information unless manually entered before the call.

This problem has been partially resolved as described in FIG. 12, which shows a conventional architecture for providing 911 service to a VoIP device.

In particular, as shown in FIG. 12, a conventional architecture routes VoIP 911 calls to a designated PSAP. However, such architecture fails to provide "enhanced" service for VoIP devices.

In particular, Option 1 in FIG. 12 shows an IP device 250 utilizing VoIP protocols for voice communications dials 9-1-1. The VoIP device 250 is serviced by a VoIP switch 220 in the VoIP service provider's network. The VoIP switch 220 communicates with a Message Servicing Center (MSC) 230. Using a database that relates the devices callback number or IP address to the owner's address, the MSC 230 can determine which PSAP has jurisdiction for that address. The MSC 230 then communicates back to the VoIP switch 220 a 10-digit telephone number for that PSAP. The VoIP Switch 220 then converts the IP call to TDM and routes the call to the designated PSAP using the provided 10-digit number.

A primary challenge results from the fact that the E911 network is not directly accessible via the Public Switched Telephone Network (PSTN); Rather, all enhanced 911 calls must be routed via dedicated local voice trunks to a selective router that in turn routes the call to the PSAP. Calls that do arrive at the PSAP arrive without callback number or location information. Provision of location information to the PSAP via the PSTN also circumvents specific PSAP hardware (e.g., CAD, GIS) designed to facilitate dispatching of responders and tracking the location of the mobile caller.

There is a need for an architecture and methodology to allow VoIP users all features relating to E911 services enjoyed by non-VoIP users, e.g., call back phone number and location information provided to a public safety answer point (PSAP), and to do so both accurately and as quickly as possible. In emergency call situations, often seconds can mean the difference between life and death.

SUMMARY OF THE INVENTION

In accordance with the principles of the present invention, a method apparatus for providing mid-call updating of a location of a VoIP terminal, comprises allowing a VoIP call to be established with said VoIP terminal. The updated location information relevant to movement of the VoIP terminal since the call was established is requested. Updated location information relevant to movement of the VoIP terminal since the call was established is transmitted.

In accordance with another aspect of the present invention, a method and apparatus for validating a location of a VoIP terminal, comprises receiving subscriber location information pushed to a VoIP location server using HTTP based protocol. The received subscriber location information is compared against a geographic location database to confirm that an address contained within the subscriber location information is valid.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides solutions covering different 911 location service aspects in support of Session Initiation Protocol (SIP) based VoIP 911 location services.

In accordance with the principles of the present invention, 911 calls made from a VoIP device are routed directly to an emergency operator, saving valuable seconds in the event of an emergency situation. Moreover, the disclosed embodiments provide accurate location information to emergency operators, as well as a call-back number in the event that the VoIP 911 caller is disconnected. The present invention allows static, portable, and mobile VoIP calls to be routed to PSAPs while automatically providing the location and identity of the caller. A robust solution for emergency services such as is disclosed herein helps to guarantee the future success and growth of VoIP technology.

The present invention provides an E-9-1-1 voice-over-IP (VoIP) solution, wherein a 911 call from a VoIP device is routed directly to the correct Public Safety Answer Point (PSAP) via dedicated trunks, and associated together with correct location information and call-back number.

In accordance with the present invention, local VoIP gateways are incorporated, and a centralized routing intelligence is implemented, to provide access to the existing E911 infrastructure.

Figure 1:
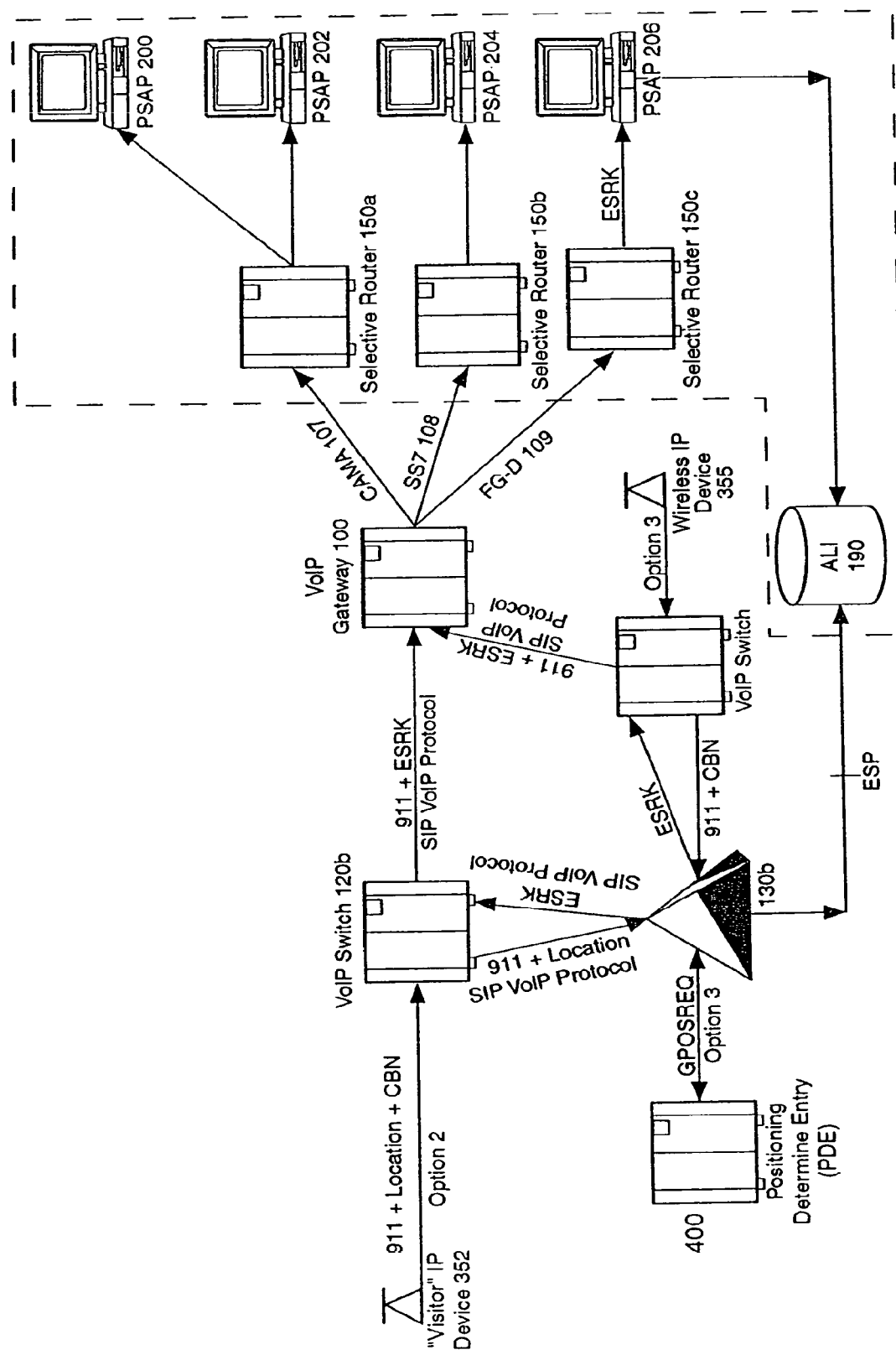
FIG. 1 shows a block diagram of the architecture of a Voice Over Internet Protocol (VoIP) solution, in accordance with the principles of the present invention.
Figure 12:
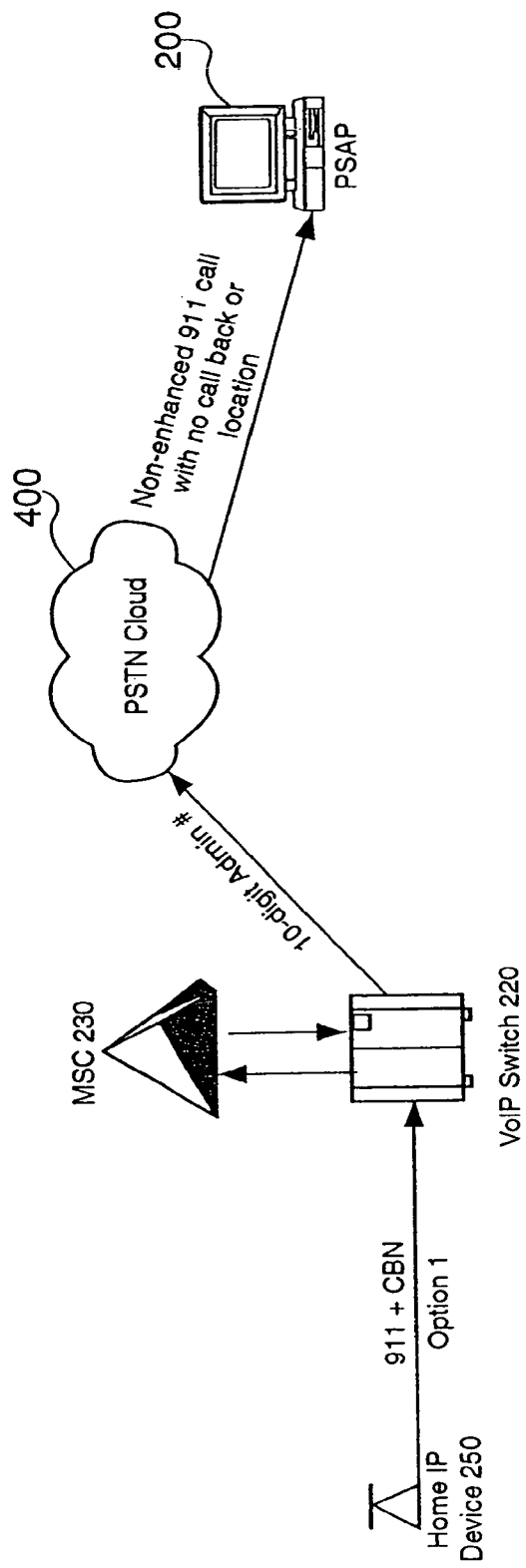
FIG. 12 shows a conventional architecture for providing 911 service to a VoIP device which does not support CBN or ALI data delivery.

FIG. 1 shows a block diagram of the architecture of the VoIP solution, in accordance with the principles of the present invention. There are two additional options illustrated, in addition to the conventional option shown in FIG. 12.

1. Option 2: providing enhanced 911 service from IP devices located at "home" or at "visitor" locations, physically connected to the VoIP network via cable.
2. Option 3: providing enhanced 911 service from mobile IP devices.

In particular, as shown in FIG. 1, VoIP gateways 100 are implemented locally, e.g., one within each local access and transport area (LATA). The local VoIP gateways 100 accept VoIP packetized data inbound, and convert it to standard wireline voice calls. Calls are routed to an IP address at the VoIP gateway 100, which then egresses the call to a voice port at a selective router. Suitable VoIP gateways 100 are otherwise conventionally known and commercially available.

Dedicated voice trunks 107-109 are installed between each local VoIP gateway 100 and appropriate selective routers 150a-150c (referred to collectively herein as selective routers 150). Examples of common voice trunks include Centralized Automatic Message Accounting (CAMA) trunks 107, Signaling System #7 (SS7) voice trunks 108, and/or FG-D trunks 109 are installed between each local VoIP gateway 100 and a respective group of selective routers 150.

The selective routers 150 are provisioned as desired and otherwise conventionally known.

An Automatic Location Identification (ALI) database 190 is included, and is provisioned with Emergency Services Location Keys (ESLKs) dedicated for VoIP use as desired and otherwise conventionally known.

Transport Control Protocol/Internet Protocol (TCP/IP) data circuits may be installed between various local VoIP gateways 100. For instance, additional IP circuits may be established between the local VoIP gateway(s) of other carriers to handle additional VoIP traffic.

The message flow resulting from a VoIP call from a given IP device, e.g., IP device 352, is now described with reference to FIG. 1.

As a descriptive example, assume a VoIP "E911" call is being placed by VoIP device 352 as shown by "Option 2" from the left side of FIG. 1. The following describes message flow to route that call directly to the correct PSAP, including the provision of location information of the VoIP device 352 to the correct PSAP.

In step 1, a caller using the VoIP device 352 dials "911" on their VoIP device 352. In the given example, the VoIP device 352 provides location information with the E911 call.

In step 2, the VoIP switch 120b servicing that particular VoIP device 352 receives the E911 call, and queries the VoIP location server (VLS) 130b for routing information. The query to the VLS 130b includes a callback number, and location information (if mobile).

In step 3, the MSC 130b relates location to specific PSAPs. If the location is static, the phone number and location will already be established in the MSC database 130b. If the VoIP device 352 is mobile, the caller provides location information at the time of log-on. This caller information will then accompany the E911 call. In certain scenarios such as even in static situations, the location information may accompany the E911 call.

In step 4, upon determination of the appropriate PSAP to receive the E911 call, the MSC 130b responds with an Emergency Service Location Key (ESLK), plus IP routing instructions to the VoIP switch 120b. The utilized ESLK is a 10-digit number compatible with the selective router that serves that particular PSAP. ESLKs uniquely identify a specific PSAP. In FIG. 1, only the selective routers 150 compatible with one local VoIP gateway 100 are shown, as are PSAPs 200-206 having dedicated E911 trunks associated with each of those selective routers 150. The person of skill in the art will understand from FIG. 1 that similar local Gateway's will be implemented throughout a large area, e.g., across state lines or even countries, each having associated selective routers, and each selective router having one or more dedicated trunk line to a given one or more PSAPs.

The ESLK provided by the VLS 130b to the VoIP switch 120b is unique to the particular PSAP servicing the location that the mobile VoIP device 352 is calling from. The IP routing instructions provided by the VLS 130b to the VoIP switch 120b identify the IP address of the correct local VoIP gateway in the local access and transport area (LATA) where the compatible selective router exists. For example, it might be the local VoIP gateway 100 shown in FIG. 1, or it might instead be another local VoIP gateway associated with another local area (e.g., another LATA).

In step 5, the VoIP switch 120b routes the VoIP E911 call to the designated VoIP gateway 100. The routed VoIP E911 call includes the ESLK.

In step 6, the VoIP gateway 100 recognizes the ESLK, and selects a corresponding voice egress trunk (e.g., CAMA, SS7 or FG-D) 107-109. The VoIP gateway 100 converts the VoIP data to voice, and egresses the E911 call to the proper selective router 150a, 150b or 150c on the selected trunk 107-109.

In step 7, as in otherwise conventional techniques, upon reaching the selective router 150a, 150b or 150c, the existing E911 infrastructure delivers the E911 call to the proper PSAP 200, 202, 204 or 206 that is assigned to the location that the mobile VoIP device 352 is calling from. Thus, the relevant selective router 150a, 150b or 150c previously provisioned to recognize the ESLK in the ANI field of the CAMA or SS7 voice E911 call, will route the E911 call to the appropriate PSAP 200, 202, 204 or 206.

In step 8, as in otherwise conventional techniques, the PSAP 200, 202, 204 or 206 receives the E911 voice call, and using the ESLK, queries the ALI database 190 for the location of the caller, and for call-back information.

The ALI database 190 steers the ESLK to the appropriate MSC 130b, which in turn responds to the ALI query with the correct location and call-back information. The disclosed ALI query employs otherwise conventional PAM or E2+ protocols.

The sequence of events for Option 1 would be similar as for the above described Option 2, except that the location information would already be stored at the VLS and would not necessarily need to forwarded by the device.

Sequence of events for Option 3 (mobile IP device) would be as follows:

In step 1, a caller using the mobile VoIP device 355 dials "911".

In step 2, the VoIP switch 120b servicing that particular VoIP device 352 receives the E911 call, and queries the VoIP location server (VLS) 130b for routing information. The query to the VLS 130b includes a callback number, but no location information.

In step 3, the MSC 130b initiates a GPOSREQ to the Position Determining Equipment (PDE) 400 serving the VoIP service provider that provides mobile coverage for the IP device. A PDE is a position determining device that determines a position, e.g., a latitude and longitude in the wireless Phase 2 world. VoIP devices may utilize various wireless communication technologies, including WiFi, 3G, and cellular technology, thus positioning equipment used for cellular devices may be utilized for VoIP devices, given the present invention.

The PDE 400, using otherwise conventional techniques, responds with a gposreq response that contains the latitude and longitude of the mobile IP device. The VLS 130b relates location to a specific PSAP.

Subsequent steps in Option 3 are similar to those described with respect to Option 2.

Implementation of E911 for VoIP callers as disclosed herein facilitates the migration of an individual PSAP to a pure VoIP environment, minimizing additional engineering as VoIP systems become more prevalent and revolutionize the telecom industry.

Figure 2:
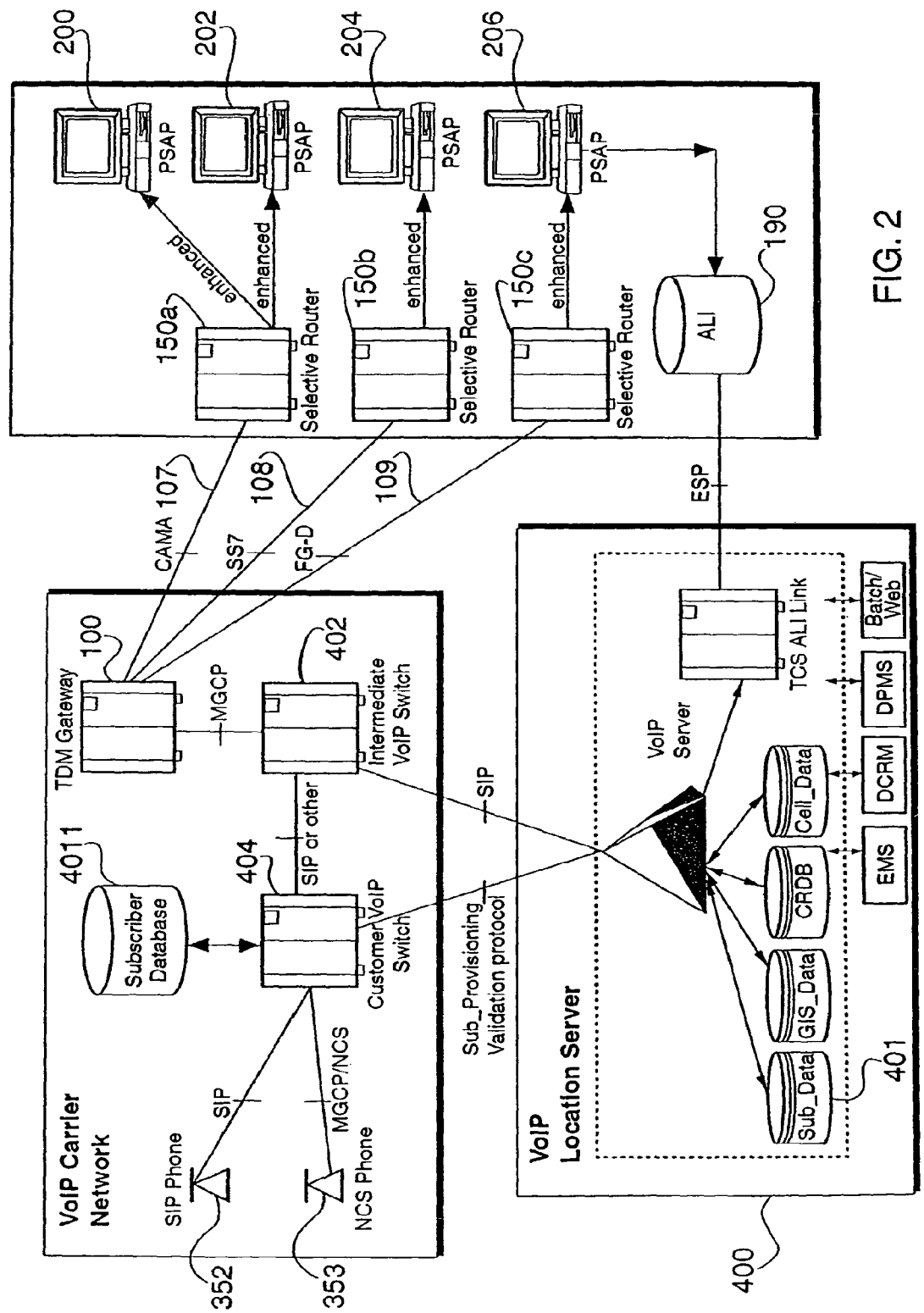
FIG. 2 shows an overview of a Voice Over IP (VoIP) location service and network context diagram, in accordance with the principles of the present invention.

FIG. 2 is another depiction of an exemplary Voice Over IP (VoIP) location service and network context diagram, in accordance with the principles of the present invention.

In particular, FIG. 2 provides an overview of the disclosed VoIP 911 Location Service, in which a VoIP Location Server 400 can either inter-connect with an intermediate VoIP Switch 402, or directly inter-connect with a customer VoIP switch 404, via standard Session Initiation Protocol (SIP) protocol. Subscriber Location Provisioning/Validation protocol is preferably simply HTTP based protocol to be used to "push" subscriber's location information stored in the Customer VoIP Switch network.

In operation, with reference to FIG. 2, a caller dials 911 via VoIP telephone 352, and the call goes to the customer's VoIP switch 404. For mobile VoIP devices 353 (e.g. a laptop), location information is provided to the VoIP switch 404 via data provided by the user at log-in. The customer's VoIP switch 404 routes the VoIP call to an intermediate (e.g., 3rd party) VoIP routing switch 402.

The intermediate VoIP switch 402 sends Call Back Number (CBN) information via SIP protocol. Note that the subscriber's location information is provisioned and validated during the subscriber's registration phase.

Based upon the location of the caller, the VoIP 911 location server 400 determines the correct public safety access point (PSAP) 200-206 to which the 911 call should be directed. The VoIP location server 400 also assigns an Emergency Service Location Key (ESLK), which importantly associates a specific PSAP to a location of a VoIP device from which the 911 call originates. The VoIP location server 400 stages the ESLK, CBN, and location information.

1) The VoIP 911 Location Server provides IP routing information to the VoIP switch 402.

2) The VoIP switch 402 routes the VoIP call via IP to the intended local VoIP gateway.

3) The VoIP gateway 100 interprets the ESLK, converts the VoIP call to CAMA or SS7 as required, and egresses the call to the correct selective router 150.

4) The call progresses to the PSAP 200-206 per existing technology.

5) The PSAP 200-206 queries the ALI 190. Existing steering instructions route the call to the VoIP Location Server ALI Link via PAM or E2

6) VoIP Location Server 400 responds with location information.

Provisioning and Validation of VoIP Subscriber Location

One of the key issues of a VoIP 911 location service is related to how a subscriber's location information can be retrieved. In the current VoIP industry standard, a VoIP subscriber is required to register in the customer VoIP switch 404. During this process, the subscriber's location information can be recorded in the customer VoIP switch 404.

However, conventionally there is an issue regarding how the location information can be used by the VoIP Location Server 400. In addition, the location information (street address etc.) may be incorrect (e.g. typo etc.) because of the need for entry of the location during registration, so validation is desirable. Aspects of the present invention as illustrated herein provide a solution for these issues. A simple HTTP based protocol is defined as such that the CP Office 307 of a local VoIP service provider can push the subscriber location information to the VoIP Location Server.

Figure 3:
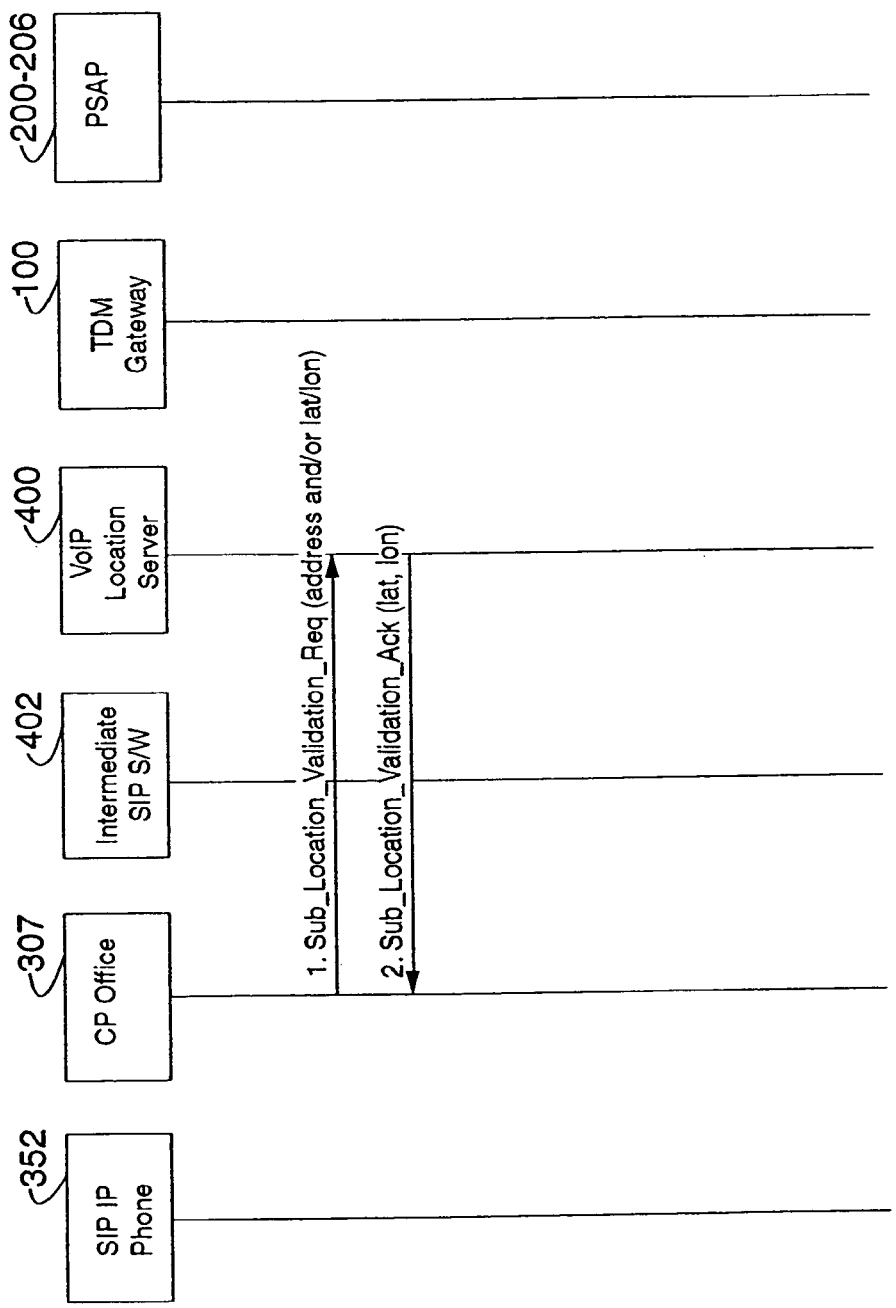
FIG. 3 shows an exemplary message flow diagram for an exemplary VoIP subscriber location provisioning and validation procedure, in accordance with the principles of the present invention.

FIG. 3 shows an exemplary message flow diagram for an exemplary VoIP subscriber location provisioning and validation procedure, in accordance with the principles of the present invention.

In particular, as shown in FIG. 3, a Sub_Location_Validation_Req message requesting address and/or longitude/latitude information about the caller, is transmitted from the CP office 307 to the VoIP location server 400. The transmitted Sub_Location_Validation_Req message preferably includes the following information:

A flag indicating action: Add/Update or Delete
VoIP Provider's Name (preferably required)
Customer Name (preferably optional);
Customer VoIP telephone number (preferably required);
Street address of the IP device preferably includes:
    Street number (preferably required. Provisions should be made for street addresses that do not use a street number);
    Street Name (preferably required);
    Street Directional (preferably required if applicable);
    Apartment # (preferably required if applicable);
    Room # (preferably required if applicable);
    Community Name (preferably required);
    State (preferably required);
    Zip code (preferably optional);
    Position information in WGS84 format (preferably optional);
    Position Source (preferably optional);
    Terminal Type (preferably optional);
    Terminal Capability (preferably optional)
    Supplemental Field #1 (preferably optional);
    Supplemental Field #2 (preferably optional);
    Supplemental Field #3 (preferably optional);
    Supplemental Field #4 (preferably optional);
latitude/longitude (preferably optional)

Upon receiving the location information, the VoIP Location Server 400 validates the location information with a geographic location database to see that the address is valid. If it is, then the VoIP location server 400 converts the location information received to latitude/longitude type information and stores the same in its subscriber database 401.

A Sub_Location_Validation_Res (or Sub_Location_Validation_Ack) message containing an indication of positive acknowledgement is passed from the VoIP location server 400 back to the CP Office 307.

Figure 4:
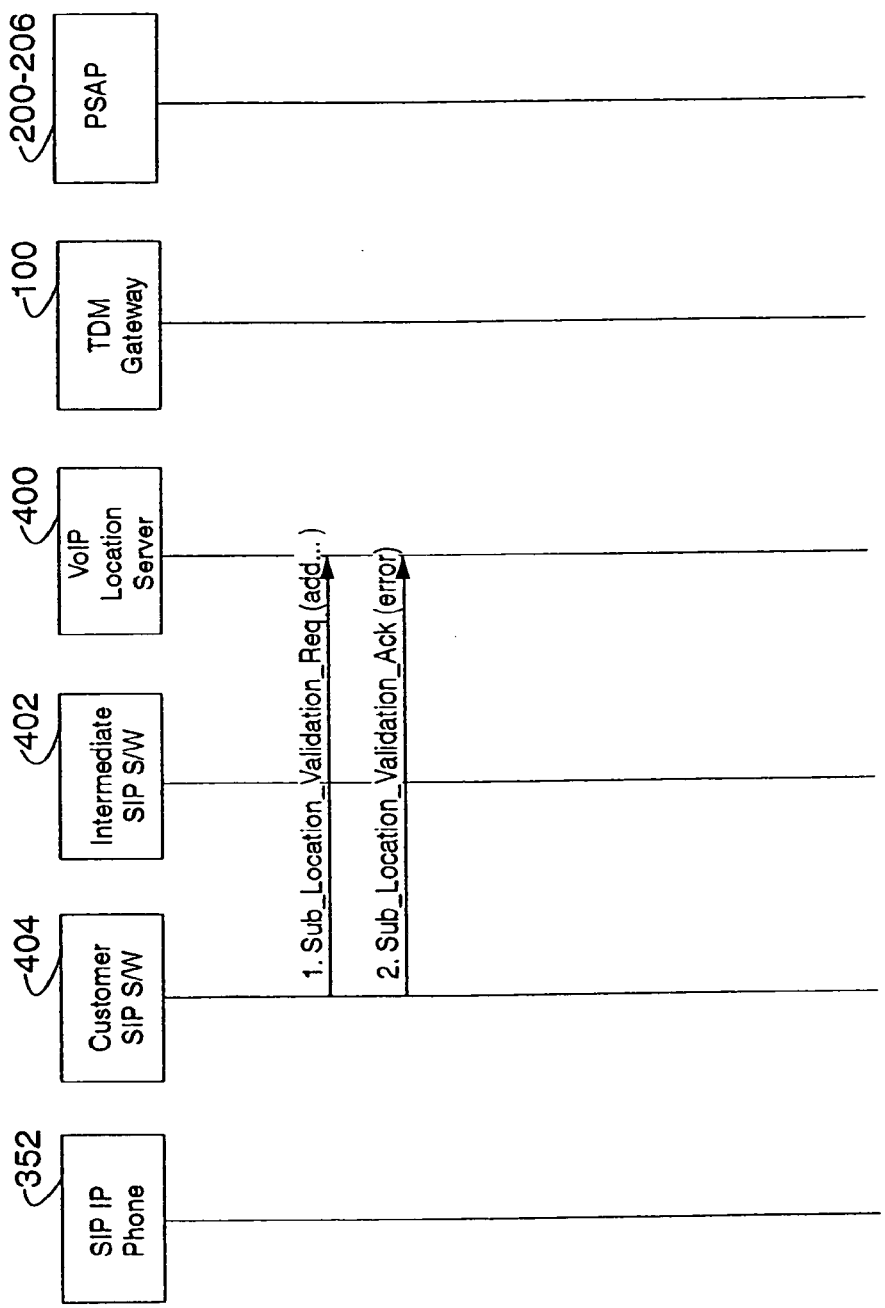
FIG. 4 shows a scenario of an unsuccessful procedure for validating and provisioning a subscriber's location, in accordance with the principles of the present invention.

FIG. 4 shows a scenario of an unsuccessful procedure for validating and provisioning a subscriber's location, in accordance with the principles of the present invention.

In particular, as shown in FIG. 4, a Sub_Location_Validation_Req( ) request message is passed from the customer VoIP switch 404 to the VoIP location server 400. The transmitted Sub_Location_Validation_Req message may include the same information as explained with reference to FIG. 3.

Upon receiving the location information, the VoIP Location Server 400 validates the location information with a geographic location database to see if the received address is valid. If there is not a match, or if the location provided is not in the 911 service coverage (e.g. not in the country), the VoIP Location Server 400 may return one of the following exemplary errors: "Record not found", or "Not in the service coverage", or similar.

911 Location Service with Call Routing via SIP Loopback Signaling

This section provides a solution to properly route a 911 call initiated by a VoIP terminal. The basic concept is that the VoIP 911 Location Server 400 decides which PSAP 200-206 should be responsible for the 911 call based on the caller's location, and provides the routing information as an ESLK inside a SIP INVITE message back to the intermediate VoIP switch 402, which in turn routes the call to the correct PSAP 200-206. The VoIP 911 Location Server 400 stays in the call signaling path, until the call is terminated by either the caller or the appropriate PSAP 200-206.

Figure 5:
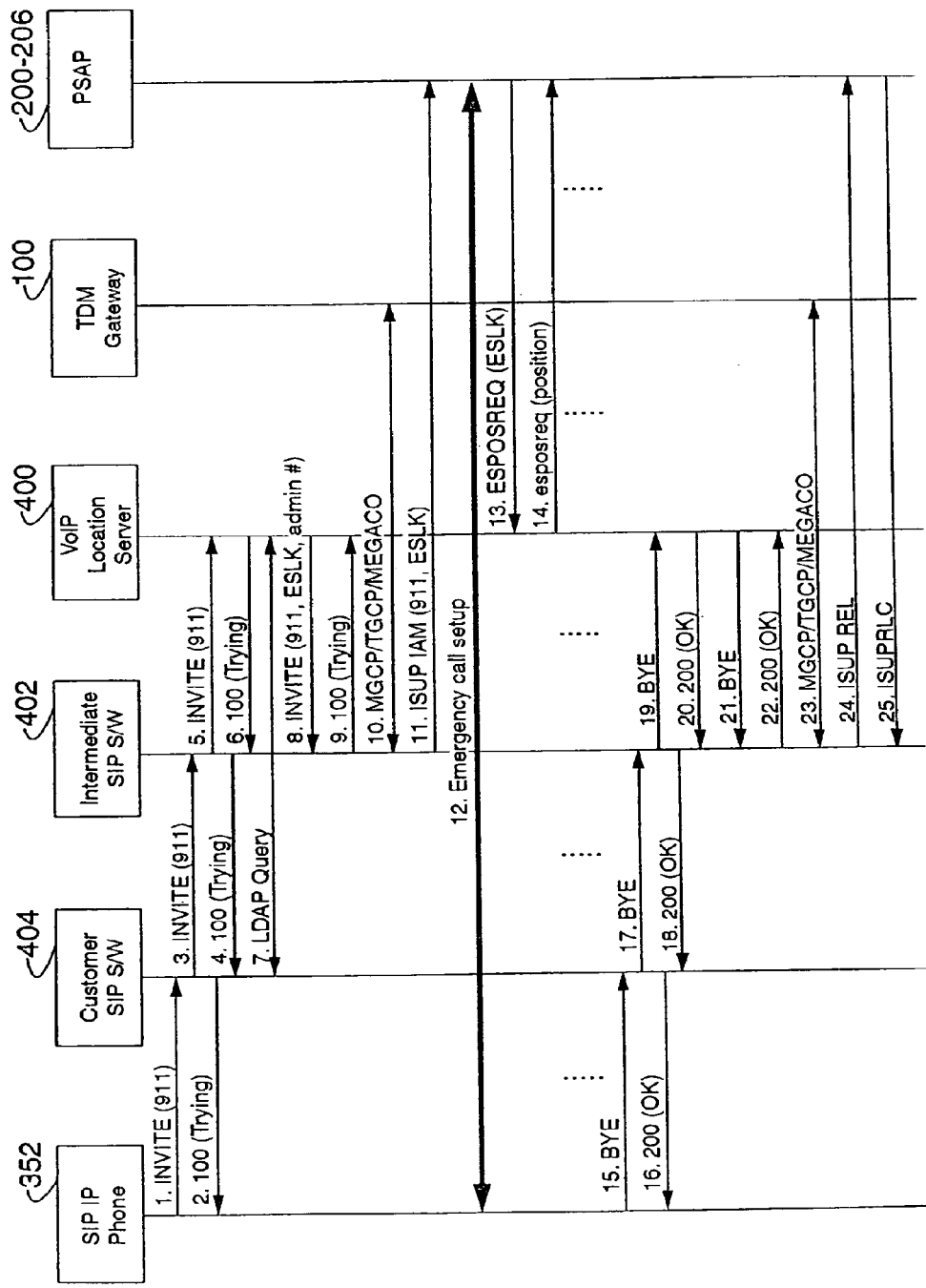
FIG. 5 shows an exemplary message flow diagram for a 911 location service with call routing via SIP loopback signaling, in accordance with the principles of the present invention.

FIG. 5 shows an exemplary message flow diagram for a 911 location service with call routing via SIP loopback signaling, in accordance with the principles of the present invention.

In particular, as shown in FIG. 5:

In step 1, a SIP IP phone initiates an emergency call by sending an SIP INVITE message to the customer's VoIP switch 404, with 911 as destination address and its own id.

In step 2, the customer VoIP switch 404 of the service provider returns a SIP 100 TRYING message to the SIP VoIP phone 352.

In step 3, the customer VoIP switch 404 of the service provider sends a SIP INVITE message to the intermediate VoIP switch 402, and routes the call to the intermediate VoIP switch 402 that connects with the VoIP Location Server 400.

In step 4, the intermediate VoIP switch 402 responds with a SIP 100 TRYING message.

In step 5, the intermediate VoIP switch 402 forwards the received SIP INVITE message to the VoIP Location Server 400.

In step 6, a SIP 100 TRYING message is returned from the VoIP location server 400 to the intermediate VoIP switch 402.

In step 7, based on information received in the INVITE message, the VoIP Location Server 400 optionally initiates a Subscriber Location Retrieval Procedure via, for example, standard remote database procedure call (such as LDAP or RPC or the like), or via the procedure described earlier, to retrieve the subscriber's location based on the registration information that the subscriber provided during the SIP Registration procedure.

In step 8, the VoIP Location Server 400 converts the caller's address to latitude/longitude (if latitude/longitude are not retrieved from the switch) and determines the ESZ of the caller, assigns an ESLK, formats a SIP INVITE message with an assigned ESLK and a default admin number for the service provider, and then sends an INVITE message back to the Intermediate VoIP softswitch 402. The INVITE message may include "911" in the "To" field, and the assigned ESLK in the "From" field.

In step 9, a SIP 100 TRYING message is returned from the VoIP location server 400 to the intermediate VoIP switch 402.

In step 10, the intermediate VoIP switch 402 reserves resources by using MGCP/MEGACO or TGCP at the TDM Gateway.

In step 11, an ISUP IAM message is sent to the appropriate PSAP 200-206.

In step 12, an emergency call is established.

In step 13, the appropriate PSAP 200-206 queries the location of the emergency caller by sending an ESPOSREQ with ESLK.

In step 14, the VoIP Location Server 400 returns the caller's position to the appropriate PSAP 200-206 in an esposreq message.

In step 15, after sometime, the emergency call is terminated by the caller, and a SIP BYE message is transmitted.

In step 16, the customer's VoIP switch 404 returns a "200" message to the VoIP SIP phone 352.

In step 17, a SIP BYE message is sent to the intermediate VoIP switch 402.

In step 18, a "200" message is returned from the intermediate VoIP switch 402 to the customer VoIP switch 404.

In step 19, the intermediate VoIP switch 402 transmits a SIP BYE message to the VoIP Location Server 400.

In step 20, the VoIP Location Server 400 returns a SIP 200 message to the intermediate VoIP server 402, and clears the call data and resources related to the call.

In step 21, the VoIP Location Server 400 sends a SIP BYE message to the intermediate VoIP switch 402 to terminate the call leg to the Intermediate VoIP switch 402.

In step 22, the intermediate VoIP switch 402 returns a SIP 200 message to the VoIP location server 400.

In step 23, the intermediate VoIP switch 402 cleans up the resources at the TDM Gateway 100 using MGCP/MEGACO or TGCP.

In step 24, an ISUP REL message is transmitted from the intermediate VoIP switch 402 to the appropriate PSAP 200-206.

In step 25, an ISUP RLC message is returned by the appropriate PSAP 200-206 to the intermediate VoIP switch 402.

Examples of SIP Messages

Incoming SIP INVITE Message

INVITE tel:911 SIP/2.0
Via: SIP/2.0/UDP pc33.atlanta.com; branch=z9hG4bK776asdhds
Max-Forwards: 10
To: EME <tel:911>
From: Alice <tel:5551234567>;tag=1928301774
Call-ID: a84b4c76e66710@pc33.atlanta.com
CSeq: 314159 INVITE
Contact: <tel:5551234567>
Content-Type: application/sdp
Content-Length: nnn Outgoing SIP INVITE Message
INVITE tel:911 SIP/2.0
  Via: SIP/2.0/UDP VoIPMPC.VoIP.com;
    branch=zkljioyuwe235kljll
  Via: SIP/2.0/UDP pc33.atlanta.com;
    branch=z9hG4bK776asdhds
  Max-Forwards: 9
  To: EME <tel:911>
  From: Alice <tel:2061234567>;tag=1928301774
  Call-ID: a84b4c76e66710@pc33.atlanta.com
  CSeq: 314159 INVITE
  Contact: <tel:2061234567>
  Contact: <tel:2063456789>
  Content-Type: application/sdp
  Content-Length: nnn
Notes
  1) Assigned ESLK is +1-206-1234567;
  2) Admin number is +1-206-3456789;
Outgoing ISUP IAM Message
  Called party number: 911
  Calling party number: 2061234567 (ESLK)
  Charge Number: 2061234567 (ESLK)
  Generic digits parameter: n/a
  Calling geodetic location: n/a
  Originating Line Information (OLI): If included, use value 00 (POTS)

Figure 6:
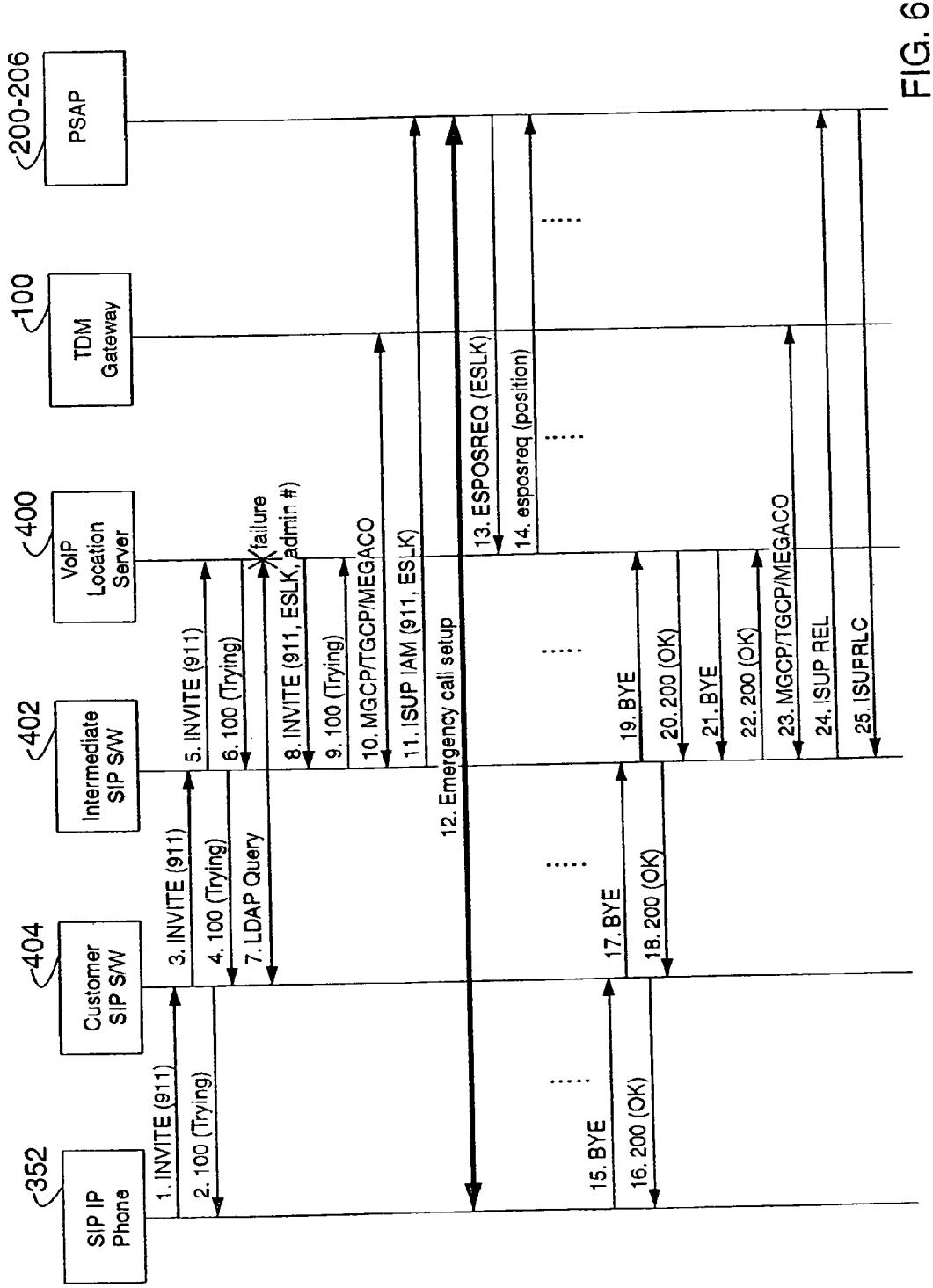
FIG. 6 shows an abnormal scenario of a 911 location service with call routing via SIP redirect signaling, in accordance with the principles of the present invention.

FIG. 6 shows an abnormal scenario of a 911 location service with call routing via SIP redirect signaling, in accordance with the principles of the present invention.

In particular, as shown in FIG. 6:

In step 1, a SIP IP phone 352 initiates an emergency call by sending an SIP INVITE message, with 911 as the destination address, and its own id.

In step 2, the customer's VoIP switch 404 of the service provider returns a SIP 100 TRYING message.

In step 3, the customer's VoIP switch 404 sends a SIP INVITE message and routes the call to the intermediate VoIP switch 402 that connects with the TCP Location Server 400.

In step 4, the intermediate VoIP switch 402 responds with a SIP 100 TRYING message.

In step 5, the intermediate VoIP switch 402 forwards the SIP INVITE message to the VoIP Location Server 400.

In step 6, a SIP 100 TRYING message is returned.

In step 7, based on information received in the INVITE message, the VoIP Location Server 400 optionally initiates a Subscriber Location Retrieval Procedure via, for example, standard remote database procedure call (e.g., LDAP or RPC or the like, or via the procedure described earlier to retrieve the subscriber's location based on the registration information that the subscriber provided during the SIP Registration procedure.

However, in this scenario, the procedure fails, or there is not a match in the database of the VoIP Location Server 400 with respect to the retrieve location.

In step 8, the VoIP Location Server 400 then uses the default PSAP 200-206 per agreement with the service provider, assigns an ESLK, formats a SIP INVITE message with assigned ESLK and a default admin number for the service provider, and then sends an INVITE message back to the Intermediate VoIP switch 402. The INVITE message preferably includes "911" in the "To" field, and the assigned ESLK in the "From" field.

In step 9, a SIP 100 TRYING message is returned.

In step 10, the intermediate VoIP switch 402 reserves resources by using MGCP/MEGACO or TGCP at the TDM Gateway 100.

In step 11, an ISUP IAM message is sent to the appropriate PSAP 200-206.

In step 12, an emergency call is established.

In step 13, the appropriate PSAP 200-206 queries the location of the emergency caller by sending an ESPOSREQ with ESLK message(s).

In step 14, the VoIP Location Server 400 returns the caller's position to the appropriate PSAP 200-206 in an ESPOSREQ message.

In step 15, after sometime, the emergency call is terminated by the caller, and a SIP BYE message is sent.

In step 16, the Customer VoIP switch 404 of the service provider returns a 200 message.

In step 17, a SIP BYE message is transmitted to the Intermediate VoIP switch 402.

In step 18, a 200 message is returned.

In step 19, the Intermediate VoIP switch 402 sends a SIP BYE message to the VoIP Location Server 400.

In step 20, the VoIP Location Server 400 returns a SIP 200 message, and clears the call data and resources related to the call.

In step 21, the VoIP Location Server 400 sends a SIP BYE message to terminate the call leg to the Intermediate VoIP switch 402.

In step 22, a SIP 200 message is returned.

In step 23, an intermediate VoIP switch cleans up the resources at the TDM Gateway 100 using MGCP/MEGACO or TGCP.

In step 24, an ISUP REL message is sent.

In step 25, an ISUP RLC message is returned.

911 Location Service with Call Routing via SIP Redirect Signaling

This section provides a more efficient solution to routing a 911 call initiated by a VoIP terminal 352. The basic concept is that the VoIP 911 Location Server 400 decides which PSAP 200-206 should be responsible for the 911 call based on the caller's location, and provides the routing information as an ESLK inside a SIP 300 response message back to the intermediate VoIP switch 402, which in turn routes the call to the correct PSAP 200-206. The VoIP 911 Location Server 400 will no longer stay in the call signaling path, and will be notified of the call termination event by a SIP NOTIFY message initiated by the Intermediate VoIP switch 402.

Note that, depending upon the implementation, the VoIP 911 Location Server 400 may need to send a SIP SUBSCRIBE message to the intermediate VoIP switch 402 as defined in IETF RFC3265. However, the intermediate VoIP switch 402 can also be implemented to always send a NOTIFY message to the 911 Location Server 400 once the 911 call is released, to simplify the signaling.

Figure 7:
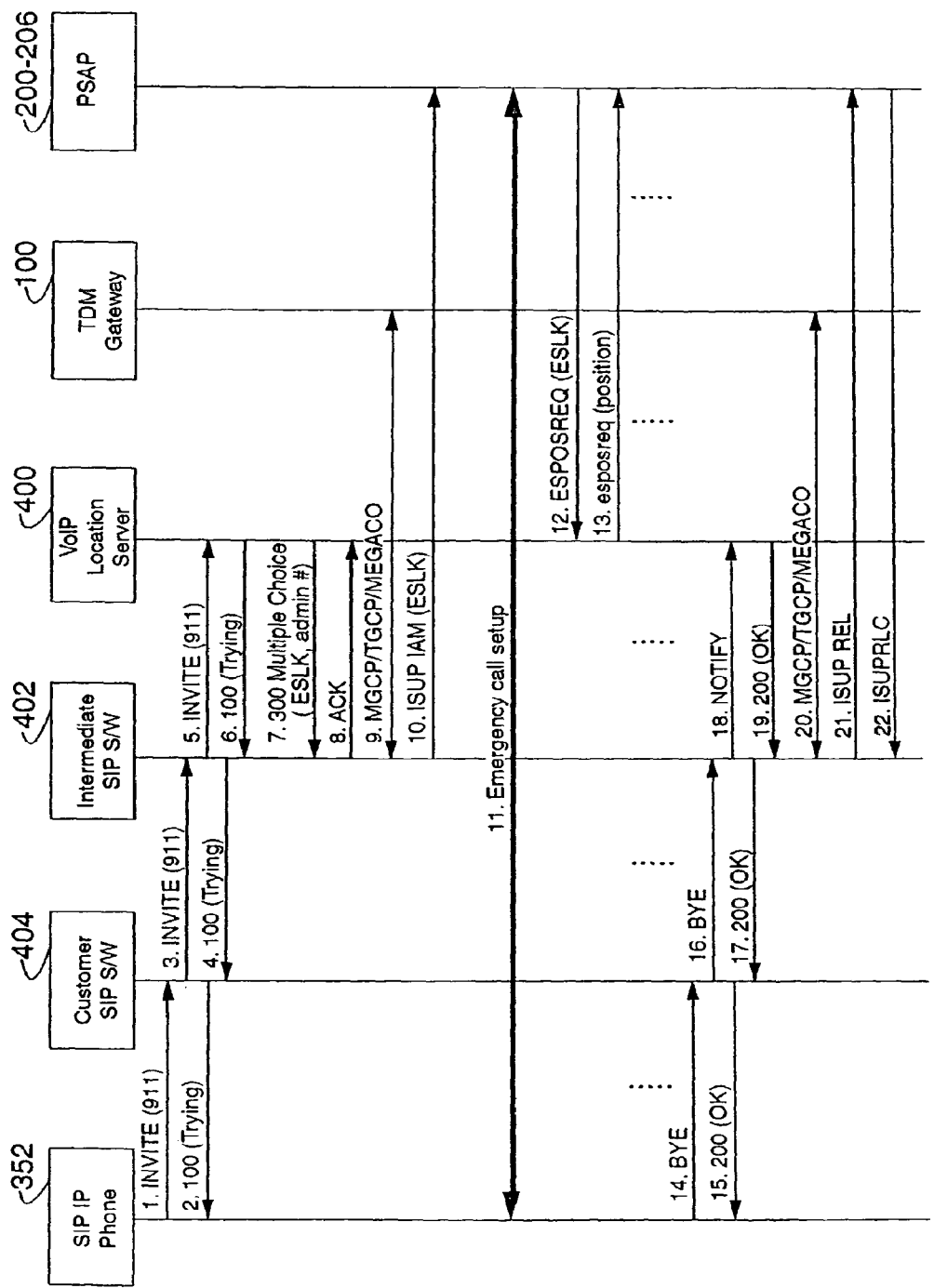
FIG. 7 shows an exemplary message flow diagram for a 911 location service with call routing via SIP redirect signaling, in accordance with another aspect of the present invention.

FIG. 7 shows an exemplary message flow diagram for a 911 location service with call routing via SIP redirect signaling, in accordance with another aspect of the present invention.

In particular, as shown in FIG. 7:

In step 1, a SIP IP phone 352 initiates an emergency call by sending an SIP INVITE message, with 911, as its destination address, and its own id.

In step 2, the customer VoIP switch 404 of their service provider returns a SIP 100 TRYING message.

In step 3, the customer VoIP switch 404 of the service provider sends a SIP INVITE message, and routes the call to the intermediate VoIP switch 402 that connects with the VoIP Location Server 400.

In step 4, the Intermediate VoIP switch 402 responds with a SIP 100 TRYING message.

In step 5, the intermediate VoIP switch 402 forwards the SIP INVITE message to the VoIP Location Server 400.

In step 6, a SIP 100 TRYING message is returned.

In step 7, the VoIP Location Server 400 then converts the caller's address to latitude/longitude (if latitude/longitude are not retrieved from the switch) and determines the ESZ of the caller, assigns an ESLK, formats a SIP 300 message with assigned ESLK and a default admin number for the service provider, and then sends the message back to the Intermediate VoIP switch 402.

In step 8, a SIP ACK message is returned.

In step 9, the intermediate VoIP switch 402 reserves resources by using MGCP/MEGACO or TGCP at the TDM Gateway 100.

In step 10, an ISUP IAM message is sent to the appropriate PSAP 200-206.

In step 11, an emergency call is established.

In step 12, the appropriate PSAP 200-206 queries the location of the emergency caller by sending an ESPOSREQ with ESLK.

In step 13, the VoIP Location Server 400 returns the caller's position to the appropriate PSAP 200-206 in an ESPOSREQ message.

In step 14, after sometime, the emergency call is terminated by the caller, and a SIP BYE message is sent.

In step 15, the customer VoIP switch 404 of the service provider returns a 200 message.

In step 16, a SIP BYE message is sent to the intermediate VoIP switch 402.

In step 17, a 200 message is returned.

In step 18, the Intermediate VoIP 402 sends a SIP NOTIFY message with an indication of call termination to the VoIP Location Server 400.

In step 19, the VoIP Location Server 400 returns a SIP 200 message, and clears the call data and resources related to the establishment of the call.

In step 20, the intermediate VoIP switch 402 cleans up the resources at the TDM Gateway 100 using MGCP/MEGACO or TGCP.

In step 21, an ISUP REL message is sent.

In step 22, an ISUP RLC message is returned.

Examples of SIP Messages

SIP INVITE Message
  INVITE sip:911@commpartners.com SIP/2.0
  Via: SIP/2.0/UDP  pc33.atlanta.com; branch=z9hG4bK776asdhds
  Max-Forwards: 10
  To: EME <sip:911@commpartners.com>
  From: Alice <sip:5551234567@commpartners.com>; tag=1928301774
  Call-ID: a84b4c76e66710@pc33.atlanta.com
  CSeq: 314159 INVITE
  Contact: <sip:5551234567@commpartners.com>
  Content-Type: application/sdp
  Content-Length: nnn
Outgoing SIP 300 Response with ESLK
  SIP/2.0 300 Multiple Choices
  Via: SIP/2.0/UDP  VoIPMPC.VoIP.com; branch=zkljioyuwe235kljll
  Via: SIP/2.0/UDP  pc33.atlanta.com; branch=z9hG4bK776asdhds
  Max-Forwards: 9
  To: EME <sip:911@commpartners.com>
  From: Alice <sip:2061234567@commpartners.com>; tag=1928301774
  Call-ID: a84b4c76e66710@pc33.atlanta.com
  CSeq: 314159 INVITE
  Contact: <sip:2061234567@commpartners.com>
  Contact: <sip:2063456789@commpartners.com>
  Content-Type: application/sdp
  Content-Length: nnn
Notes
  1) Assigned ESLK is +1-206-1234567;
  2) Admin number is +1-206-3456789;
ISUP IAM Message
  Called party number: 911
  Calling party number: 2061234567 (ESLK)
  Charge Number: 2061234567 (ESLK)
  Generic digits parameter: n/a
  Calling geodetic location: n/a
  Originating Line Information (OLI): If included, use value 00 (POTS)

Figure 8:
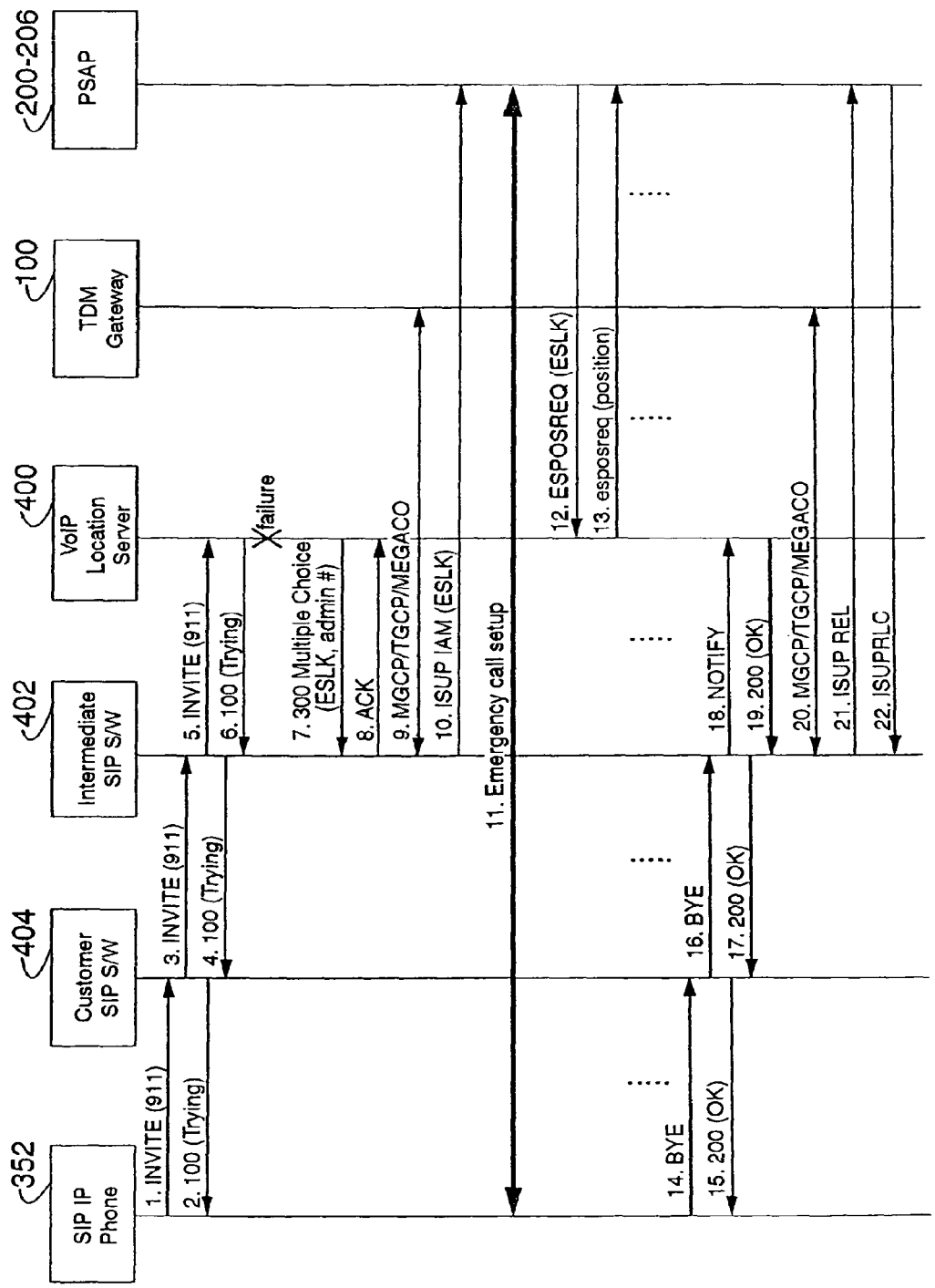
FIG. 8 shows an exemplary abnormal scenario of a 911 location service with call routing via SIP redirect signaling, in accordance with the principles of the present invention.

FIG. 8 shows an exemplary abnormal scenario of a 911 location service with call routing via SIP redirect signaling, in accordance with the principles of the present invention.

In particular, as shown in FIG. 8:

In step 1, a SIP IP phone 352 initiates an emergency call by sending an SIP INVITE message, with 911 as its destination address and its own id.

In step 2, the customer VoIP switch 404 of the service provider returns a SIP 100 TRYING message.

In step 3, the customer VoIP switch 404 of the service provider sends a SIP INVITE message, and routes the call to the intermediate VoIP switch 402 that connects with the TCP Location Server 400.

In step 4, the Intermediate VoIP switch 402 responds with a SIP 100 TRYING message.

In step 5, the Intermediate VoIP switch 402 forwards the SIP INVITE message to the VoIP Location Server 400.

In step 6, a SIP 100 TRYING message is returned.

In step 7, given the failure scenario of the present embodiment for purposes of explanation, the VoIP Location Server 400 is not able to find the caller's address based on the calling party number, so it then assigns a default ESLK, formats a SIP 300 message with assigned ESLK and a default admin number for the service provider, and then sends the message back to the Intermediate VoIP switch 402.

In step 8, a SIP ACK message is returned.

In step 9, the intermediate VoIP switch 402 reserves resources by using MGCP/MEGACO or TGCP at the TDM Gateway 100.

In step 10, an ISUP IAM message is sent to the appropriate PSAP 200-206.

In step 11, an emergency call, is established.

In step 12, the appropriate PSAP 200-206 queries the location of the emergency caller by sending an ESPOSREQ with ESLK.

In step 13, the VoIP Location Server 400 returns the caller's position to the appropriate PSAP 200-206 in an ESPOSREQ message.

In step 14, after sometime, the emergency call is terminated by the caller, and a SIP BYE message is sent.

In step 15, the customer VoIP switch 404 of their service provider returns a 200 message.

In step 16, a SIP BYE message is sent to the Intermediate VoIP switch 402.

In step 17, a 200 message is returned.

In step 18, the Intermediate VoIP switch 402 sends a SIP NOTIFY message with an indication of, call termination to the VoIP Location Server 400.

In step 19, the VoIP Location Server 400 returns a SIP 200 message, and clears the call data and resources related to establishment of the call.

In step 20, the Intermediate VoIP switch 402 cleans up the resources at the TDM Gateway 100 using MGCP/MEGACO or TGCP.

In step 21, an ISUP REL message is sent.

In step 22, an ISUP RLC message is returned.

Mid-Call Updated Location Services for VoIP Mobility

Mobility related to VoIP 911 location services is becoming increasingly important, particularly as more and more SIP based IP phones (VoIP phones) become convenient for carrying, and also as 802.11 based WiFi wireless data services provide better coverage, Similar to 911 location services for wireless mobile telephony industry, it is proposed that PSAPs have the additional capability to request updated location information in the middle of the emergency call. The present invention envisions a solution to support a mid-call updated location request.

In accordance with the principles of the present invention, mid-call updated location requests can use standard SIP INFORMATION methodology (RFC 2976) to communicate with the VoIP terminal 352 that initiated a 911 call, to retrieve updated location information. Note that mid-call location updates as disclosed herein may be (and are in the disclosed embodiments) independent from actual positioning implemented or integrated in the VoIP terminal 352 itself. This provides a rather generic protocol mechanism to enable updated location retrieval during an emergency call.

Figure 9:
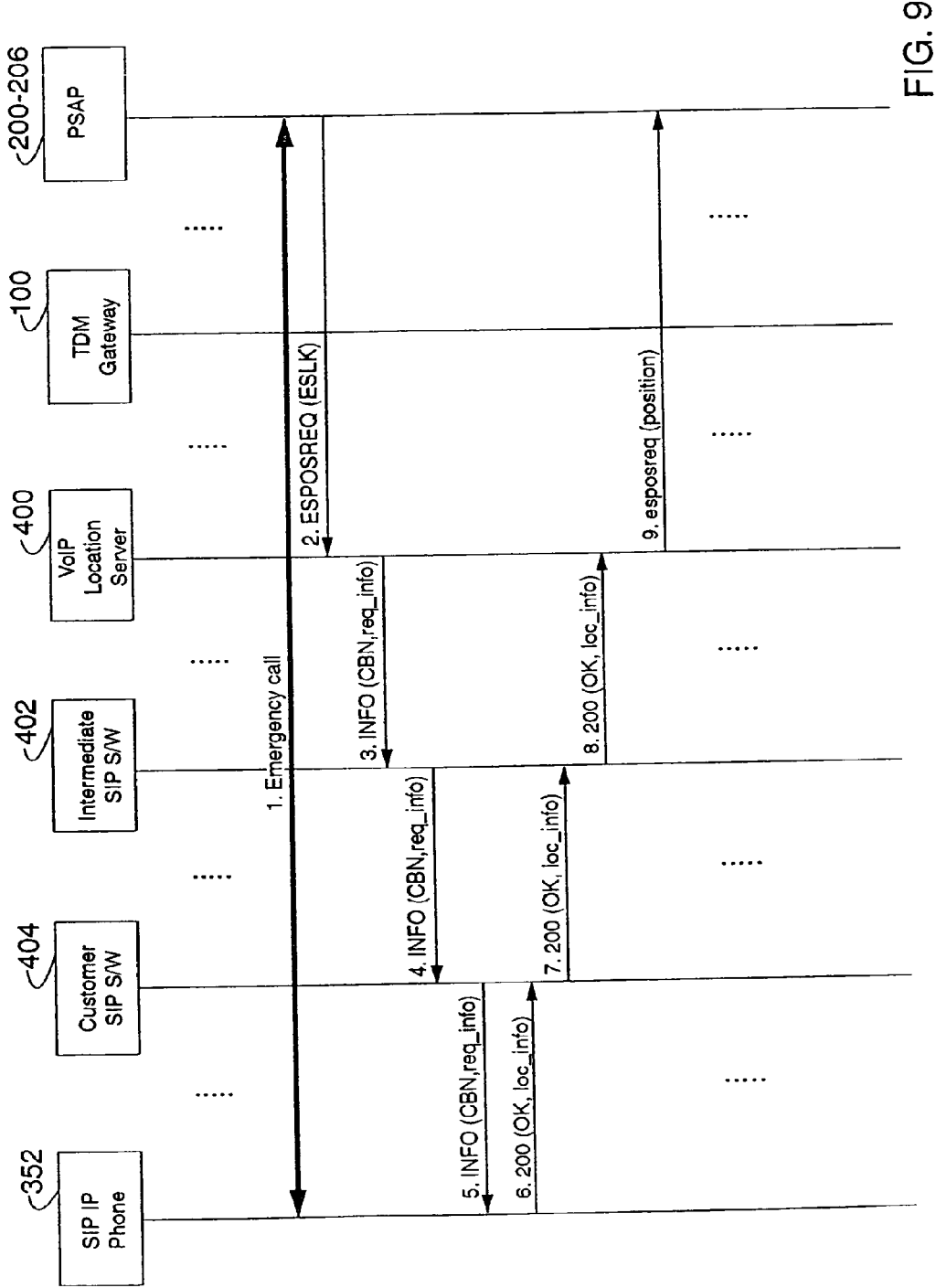
FIG. 9 shows another exemplary abnormal scenario of a 911 location service with call routing via SIP redirect signaling, in accordance with the principles of the present invention.

FIG. 9 shows another exemplary abnormal scenario of a 911 location service with call routing via SIP redirect signaling, in accordance with the principles of the present invention.

In particular, as shown in FIG. 9:

In step 1, an emergency call has been established between the VoIP terminal 352 and the appropriate PSAP 200-206, using any one of the call routing methods, e.g., as described herein above.

In step 2, the appropriate PSAP 200-206 queries the VoIP location server (VLS) 400 for an updated location of the emergency caller. As disclosed, the updated location information is obtained with the transmission of an ESPOSREQ with ESLK.

In step 3, the VoIP Location Server 400 checks its database, finds the record of the emergency call based on ESLK, and sends a SIP INFORMATION message indicating that updated location information is required to be transmitted to the intermediate VoIP switch 402.

In step 4, the intermediate VoIP switch 402 forwards the INFORMATION message to the customer VoIP switch 404.

In step 5, the customer VoIP switch 404 forwards the INFORMATION message to the VoIP terminal 352 that initiated the emergency call.

In step 6, upon receiving the INFORMATION message, depending on the specific capability that the particular calling VoIP terminal 352 has (e.g. AGPS may be integrated with the VoIP terminal 352), the VoIP terminal 352 performs appropriate procedures to generate the current location information. The VoIP terminal then sends updated location information, e.g., in a SIP 200 response message to the customer VoIP switch 404 provided by their service provider.

In step 7, the customer VoIP switch 404 forwards the SIP 200 response message to the intermediate VoIP switch 402.

In step 8, the intermediate VoIP switch 402 forwards the SIP 200 response message to the customer VoIP switch 404.

In step 9, the VoP Location Server 400 returns the caller's updated position to the relevant PSAP 200-206, e.g., in an ESPOSREQ message.

911 Location Service with Call Routing via Stateless SIP Proxy

This section provides a solution to route 911 call initiated by VoIP terminal. The basic concept is that the VoIP 911 Location Server decides which PSAP should be responsible for the 911 call based on the caller's location, and forwards the SIP call signaling message with the routing information as an ESLK to the intermediate switch, which in turn routes the call to the correct PSAP. The VoIP 911 Location Server stays in the call signaling path, until the call is terminated by either the caller or PSAP.

Figure 10:
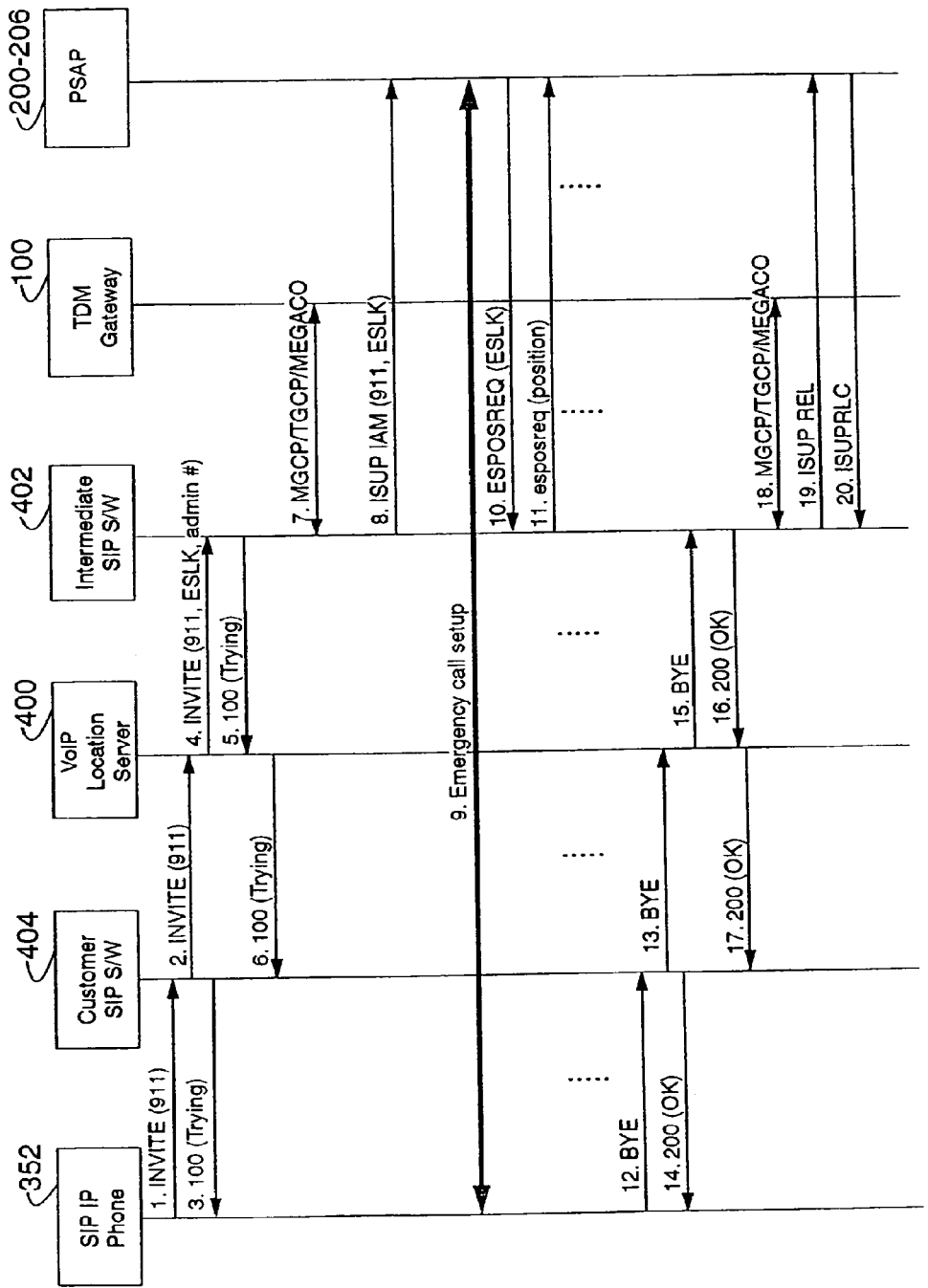
FIG. 10 shows 911 Location Service with Call Routing via SIP Loopback Signaling, in accordance with another aspect of the present invention.

FIG. 10 shows 911 Location Service with Call Routing via SIP Loopback Signaling, in accordance with another aspect of the present invention.

In particular, as shown in FIG. 10:

In step 1, a SIP IP phone initiates an emergency call by sending an SIP INVITE message, with 911 as destination address and its own ID.

In step 2, the Softswitch of the service provider sends a SIP INVITE message and route the call to TCP Location Server.

In step 3, based on the information received in the INVITE message, VoIP Location Server retrieves the subscriber's location provided by Customer SIP S/W during Subscriber Location Provision/Validation procedure as illustrated in FIG. 3. Then VoIP Location Server converts the caller's address to lat/lon (if lat/lon are not retrieved from the SW) and determines the ESZ of the caller, assigns an ESLK, formats a SIP INVITE message with assigned ESLK and a default admin number for the service provider, and then sends INVITE message back to the Intermediate softswitch. The INVITE message includes "911" in "To", and the assigned ESLK in "From" (see details in next Page).

In step 4, the Intermediate Softswitch responds with a SIP 100 TRYING.

In step 5, the VoIP Location Server forwards SIP 100 TRYING to the Customer SIP S/W.

In step 6, the Softswitch of service provider returns a SIP 100 TRYING.

In step 7, the intermediate softswitch reserves resource by using MGCP/MEGACO or TGCP at the TDM Gateway.

In step 8, an ISUP IAM is sent to the PSAP.

In step 9, an emergency call is established.

In step 10, the PSAP queries the location of the emergency caller by sending, for example, an ESP ESPOSREQ with ESLK.

In step 11, the VoIP Location Server returns the caller's position to the PSAP in an esposreq message.

In step 12, after sometime, the emergency call is terminated by the caller, a SIP BYE message is sent.

In step 13, the customer SIP S/W forwards SIP BYE message to VoIP Location Server.

In step 14, the customer SIP S/W returns a SIP 200 message.

In step 15, the VoIP Location Server forwards the SIP BYE to the Intermediate S/W.

In step 16, the intermediate S/W returns a SIP 200 message.

In step 17, the VoIP Location Server forwards SIP 200 message back to Customer SIP S/W.

In step 18, the intermediate SW cleans up the resource at TDM Gateway using MGCP/MEGACO or TGCP.

In step 19, an ISUP REL message is sent.

In step 20, an ISUP RLC message is returned.

Example of SIP Messages
Incoming SIP INVITE Message
  INVITE tel:911 SIP/2.0
    Via: SIP/2.0/UDP pc33.atlanta.com; branch=z9hG4bK776asdhds
    Max-Forwards: 10
    To: EME <tel:911>
    From: Alice <tel:5551234567>;tag=1928301774
    Call-ID: a84b4c76e66710@pc33.atlanta.com
    CSeq: 314159 INVITE
    Contact: <tel:5551234567>
    Content-Type: application/sdp
    Content-Length: nnn
Outgoing SIP INVITE Message
  INVITE tel:911 SIP/2.0
    Via: SIP/2.0/UDP VoIPMPC.VoIP.com; branch=zkljioyuwe235kljll
    Via: SIP/2.0/UDP pc33.atlanta.com; branch=z9hG4bK776asdhds
    Max-Forwards: 9
    To: EME <tel:911>
    From: Alice <tel:2061234567>;tag=1928301774
    Call-ID: a84b4c76e66710@pc33.atlanta.com
    CSeq: 314159 INVITE
    Contact: <tel:2061234567>
    Contact: <tel:2063456789>
    Content-Type: application/sdp
    Content-Length: nnn
Notes
  1) Assigned ESLK is +1-206-1234567;
  2) Admin number is +1-206-3456789;
Outgoing ISUP IAM Message
  Called party number: 911
  Calling party number: 2061234567 (ESLK)
  Charge Number: 2061234567 (ESLK)
  Generic digits parameter: n/a
  Calling geodetic location: n/a
  Originating Line Information (OLI): If included, use value 00 (POTS)

Figure 11:
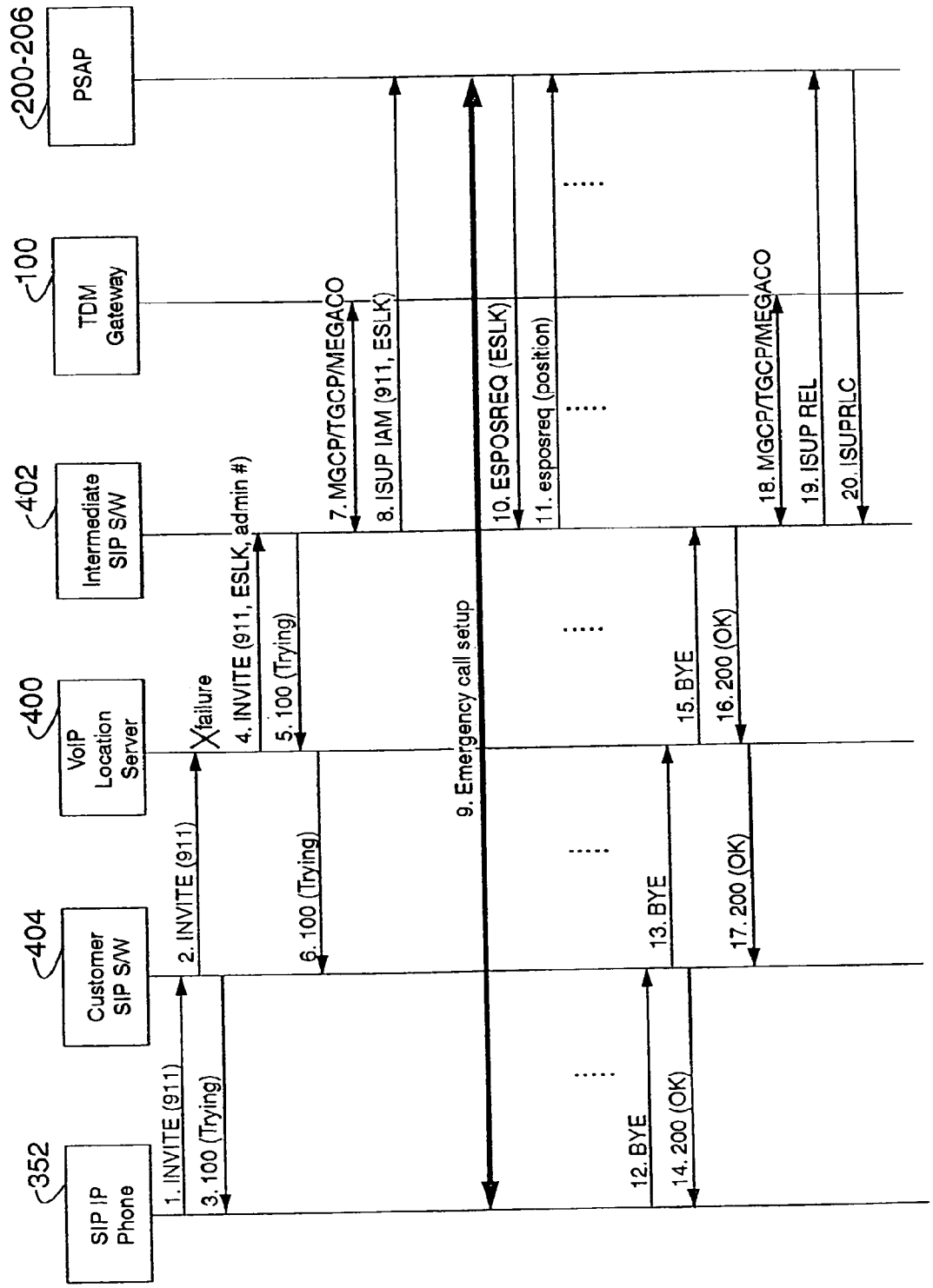
FIG. 11 shows an abnormal Scenario of 911 Location Service with Call Routing via SIP Redirect Signaling, in accordance with another aspect of the present invention.

FIG. 11 shows an abnormal Scenario of 911 Location Service with Call Routing via SIP Redirect Signaling, in accordance with another aspect of the present invention.

In particular, as shown in FIG. 11:

In step 1, a SIP IP phone initiates an emergency call by sending an SIP INVITE message, with 911 as destination address and its own ID.

In step 2, the Softswitch of the service provider sends a SIP INVITE message and route the call to TCP Location Server.

In step 3, based on the information received in the INVITE message, VoIP Location Server tries to retrieve the subscriber's location provided by Customer SIP S/W during Subscriber Location Provision/Validation procedure as illustrated in FIG. 3, however, no location info is found. Then VoIP Location Server uses a default location and ESZ for the VoIP provider, assigns an ESLK, formats a SIP INVITE message with assigned ESLK and a default admin number for the service provider, and then sends INVITE message back to the Intermediate softswitch. The INVITE message includes "911" in "To", and the assigned ESLK in "From" (see details in next Page).

In step 4, the intermediate Softswitch responds with a SIP 100 TRYING.

In step 5, the VoIP Location Server forwards SIP 100 TRYING to the Customer SIP S/W.

In step 6, the Softswitch of service provider returns a SIP 100 TRYING.

In step 7, the intermediate softswitch reserves resource by using MGCP/MEGACO or TGCP at the TDM Gateway.

In step 8, an ISUP IAM is sent to the PSAP.

9). Emergency call is established.

In step 10, the PSAP queries the location of the emergency caller by sending, for example, an ESP ESPOSREQ with ESLK.

In step 11, the VoIP Location Server returns the caller's position to the PSAP in an esposreq message.

In step 12, after sometime, the emergency call is terminated by the caller, a SIP BYE message is sent.

In step 13, the customer SIP S/W forwards SIP BYE message to VoIP Location Server.

In step 14, the customer SIP S/W returns a SIP 200 message.

In step 15, the VoIP Location Server forwards the SIP BYE to the Intermediate S/W.

In step 16, an intermediate S/W returns a SIP 200 message.

In step 17, the VoIP Location Server forwards SIP 200 message back to Customer SIP S/W.

In step 18, the intermediate SW cleans up the resource at TDM Gateway using MGCP/MEGACO or TGCP.

In step 19, an ISUP REL message is sent.

In step 20, an ISUP RLC message is returned.

The present invention enables automatic fallbacks to a location system by automatically performing a message tunneling feature to ensure that communication between the location service system and the target mobile is secure and uninterrupted as the mobile VoIP device 352 travels.

The disclosed embodiments may also comprise a VoIP E9-1-1 ALI Service—a capability which allows any fixed, portable, or mobile VoIP directory number to be correlated with current geographic coordinates and nearest street address as provided by a standard Automatic Line Identification (ALI) database.

The disclosed embodiments may further comprise a VoIP E9-1-1 ESLK Service—a Emergency Services Location Key (ESLK) capability which handles call routing management, ensuring that the originating location of the call will determine the subsequent routing of the emergency call to the closest PSAP.

Another feature of the disclosed embodiments is that they may include a VoIP E9-1-1 ALI Link Service—a capability which allows any VoIP Service Provider to interconnect to any existing PSAP connection currently supporting basic wireless E9-1-1 services (currently estimated to be greater than 65% of all existing PSAPs).

Also, a VoIP E9-1-1 VPC service may be implemented, wherein a Positioning Center supporting VoIP calls which will interact with a wide variety of VoIP switching infrastructure to pass the current known location information.

While the invention has been described with reference to the exemplary embodiments thereof, those skilled in the art will be able to make various modifications to the described embodiments of the invention without departing from the true spirit and scope of the invention.

What is claimed is:

1. A method of providing location information for a VoIP emergency communication, comprising:

attempting to obtain a current location of a wireless phone that initiated an established emergency Voice over Internet Protocol (VoIP) communication;

assigning a default Emergency Services Location Key (ESLK) to said established emergency VoIP communication; and transmitting, from a physical location server, a Session Initiation Protocol (SIP) message including said assigned default Emergency Services Location Key (ESLK), to a VoIP switch.

2. The method of providing location information for a VoIP emergency communication according to claim 1, wherein:
said default ESLK is based on a pre-registered address of said wireless phone.

3. The method of providing location information for a VoIP emergency communication according to claim 1, wherein said physical location server comprises:
a physical VoIP location server.

4. The method of providing location information for a VoIP emergency communication according to claim 3, further comprising:
removing said physical VoIP location server from a call signaling path of said emergency VoIP communication after said emergency VoIP communication has been established and before said emergency VoIP communication is terminated.

5. The method of providing location of a Voice Over Internet Protocol (VoIP) terminal according to claim 3, wherein:
said current location of said wireless phone that initiated said established emergency VoIP communication is attempted from a public safety answering point (PSAP).

6. The method of providing location information for a VoIP emergency communication according to claim 1, wherein said SIP message further comprises:
a default callback phone number.

7. The method of providing location information for a VoIP emergency communication according to claim 6, wherein:
said default callback phone number is an admin number.

8. The method of providing location information for a VoIP emergency communication according to claim 6, wherein:
said default callback phone number is an admin phone number of a service provider.

9. The method of providing location information for a VoIP emergency communication according to claim 1, wherein said SIP message further comprises:
a phone number of an initiating VoIP handset.

10. The method of providing location information for a VoIP emergency communication according to claim 1, wherein:
said emergency VoIP communication is an E911 call.

11. The method of providing location information for a VoIP emergency communication according to claim 1, further comprising:

receiving a call termination event relating to said emergency VoIP communication within a SIP NOTIFY message initiated by said VoIP switch.

12. Apparatus for providing location information for a VoIP emergency communication, comprising:
means for attempting to obtain a current location of a wireless phone that initiated an established emergency Voice over Internet Protocol (VoIP) communication;
means for assigning a default Emergency Services Location Key (ESLK) to said established emergency VoIP communication; and
means for transmitting, from a physical location server, a Session Initiation Protocol (SIP) message including said assigned default Emergency Services Location Key (ESLK), to a VoIP switch.

13. The apparatus for providing location information for a VoIP emergency communication according to claim 12, wherein:
said default ESLK is based on a pre-registered address of said wireless phone.

14. The apparatus for providing location information for a VoIP emergency communication according to claim 12, wherein said physical location server comprises:
a physical VoIP location server.

15. The apparatus for providing location information for a VoIP emergency communication according to claim 14, further comprising:
means for removing said physical VoIP location server from a call signaling path of said emergency VoIP communication after said emergency VoIP communication has been established and before said emergency VoIP communication is terminated.

16. The apparatus for providing location information for a VoIP emergency communication according to claim 12, wherein said SIP message further comprises:
a default callback phone number.

17. The apparatus for providing location information for a VoIP emergency communication according to claim 12, wherein said SIP message further comprises:
a phone number of an initiating VoIP handset.

18. The apparatus for providing location information for a VoIP emergency communication according to claim 12, wherein:
said emergency VoIP communication is an E911 call.

19. The apparatus for providing location information for a VoIP emergency communication according to claim 12, further comprising:
means for receiving a call termination event relating to said emergency VoIP communication within a SIP NOTIFY message initiated by said VoIP switch.

* * * * *